United States Patent
Chu et al.

(10) Patent No.: US 12,085,260 B2
(45) Date of Patent: *Sep. 10, 2024

(54) BACKLIGHT MODULE AND DISPLAY DEVICE

(71) Applicants: Radiant(Guangzhou) Opto-Electronics Co., Ltd, Guangdong (CN); Radiant Opto-Electronics Corporation, Kaohsiung (TW)

(72) Inventors: Yen-Chuan Chu, Kaohsiung (TW); Chia-Yin Chang, Kaohsiung (TW); Chin-Ting Weng, Kaohsiung (TW); Yi-Ching Chung, Kaohsiung (TW); Hao Chen, Kaohsiung (TW)

(73) Assignees: Radiant(Guangzhou) Opto-Electronics Co., Ltd, Guangdong (CN); Radiant Opto-Electronics Corporation, Kaohsiung (TW)

( * ) Notice: Subject to any disclaimer, the term of this patent is extended or adjusted under 35 U.S.C. 154(b) by 56 days.

This patent is subject to a terminal disclaimer.

(21) Appl. No.: 17/447,199
(22) Filed: Sep. 9, 2021
(65) Prior Publication Data
US 2021/0404633 A1   Dec. 30, 2021

Related U.S. Application Data

(63) Continuation of application No. 16/891,092, filed on Jun. 3, 2020, now Pat. No. 11,156,341, which is a (Continued)

(51) Int. Cl.
*F21V 13/04* (2006.01)
*F21V 3/04* (2018.01)
(Continued)

(52) U.S. Cl.
CPC .............. *F21V 13/04* (2013.01); *F21V 3/049* (2013.01); *F21Y 2105/16* (2016.08);
(Continued)

(58) Field of Classification Search
CPC .......... F21V 13/04; F21V 3/049; F21V 5/007; G02F 1/133603; G02F 1/133606;
(Continued)

(56) References Cited

U.S. PATENT DOCUMENTS 5,396,350 A * 3/1995 Beeson ................ G02B 6/0053
359/251
7,220,026 B2 * 5/2007 Ko ........................ G02B 6/0036
362/339
(Continued)

FOREIGN PATENT DOCUMENTS

CN   1816719 A   8/2006
CN   2802545 Y   8/2006
(Continued)

OTHER PUBLICATIONS

Tanaka, Liquid Crystal Display, Sep. 30, 2010, JP2010217349A (Year: 2010).*

*Primary Examiner* — Peggy A Neils
*Assistant Examiner* — James M Endo
(74) *Attorney, Agent, or Firm* — CKC & Partners Co., LLC

(57) ABSTRACT

A backlight module and a display device are provided. The backlight module includes a light source structure and at least one optical film. The optical film is disposed above the light source structure. The optical film includes a main body and plural optical structures. The optical structures are disposed on the main body. Each of the optical structures is a tapered structure. Each of the optical structures has plural side surfaces, and a portion of light emitted from the light source structure is guided toward plural primary directions when passing through the side surfaces of the optical structures, and therefore the light emitted from the light source is no longer concentrated on the top of each of the optical structures.

16 Claims, 10 Drawing Sheets

Related U.S. Application Data continuation of application No. PCT/CN2019/086763, filed on May 14, 2019.

(51) Int. Cl.
  *F21Y 105/16* (2016.01)
  *F21Y 115/10* (2016.01)
  *G02F 1/1335* (2006.01)
  *G02F 1/13357* (2006.01)

(52) U.S. Cl.
  CPC ..... *F21Y 2115/10* (2016.08); *G02F 1/133603* (2013.01); *G02F 1/133607* (2021.01)

(58) Field of Classification Search
  CPC ......... G02F 1/133605; G02F 1/133611; G02F 2001/133607; G02F 1/133607; G02B 6/0051; G02B 6/0053; G02B 6/005; G02B 6/0061; G02B 6/004
  See application file for complete search history.

(56) References Cited

U.S. PATENT DOCUMENTS

| | | | |
|---|---|---|---|
| 7,530,719 B2 * | 5/2009 | Yamashita | G02B 5/045 362/626 |
| 7,568,826 B2 * | 8/2009 | Hamada | G02F 1/133603 362/613 |
| 11,156,341 B2 * | 10/2021 | Chu | G02F 1/133611 |
| 2005/0201109 A1 * | 9/2005 | Shimura | F21V 5/045 362/382 |
| 2006/0152943 A1 | 7/2006 | Ko et al. | |
| 2009/0122517 A1 * | 5/2009 | Park | G02B 6/0061 362/97.1 |
| 2010/0033957 A1 * | 2/2010 | Lin | G02F 1/133606 362/97.2 |
| 2010/0177258 A1 * | 7/2010 | Shinozaki | G02F 1/133603 349/58 |
| 2012/0057326 A1 * | 3/2012 | Zheng | G02F 1/133611 362/84 |
| 2015/0124445 A1 * | 5/2015 | Park | F21V 7/0016 362/235 |
| 2016/0170264 A1 | 6/2016 | Qin | |
| 2016/0363747 A1 * | 12/2016 | Krijn | G02B 19/0066 |
| 2017/0160591 A1 * | 6/2017 | Cho | G02F 1/133606 |
| 2018/0120638 A1 | 5/2018 | Tseng et al. | |
| 2019/0107665 A1 | 4/2019 | Bu et al. | |

FOREIGN PATENT DOCUMENTS

| | | |
|---|---|---|
| CN | 101344682 A | 1/2009 |
| CN | 101354113 A | 1/2009 |
| CN | 102959759 A | 3/2013 |
| CN | 105546476 A | 5/2016 |
| CN | 105588010 A | 5/2016 |
| CN | 209708513 U | 11/2019 |
| JP | 2005043611 A | 2/2005 |
| JP | 2010217349 A * | 9/2010 |
| KR | 1020060039439 A | 5/2006 |
| TW | 200907434 A | 2/2009 |
| WO | 2012096203 A1 | 7/2012 |

* cited by examiner

BACKLIGHT MODULE AND DISPLAY DEVICE

RELATED APPLICATIONS

This application is a continuation application of U.S. application Ser. No. 16/891,092 filed on Jun. 3, 2020, which is a continuation application of International Application No. PCT/CN2019/086763 filed on May 14, 2019. The entire disclosures of all the above applications are hereby incorporated by reference herein.

BACKGROUND

Field of Invention

The present disclosure relates to a light source element. More particularly, the present disclosure relates to a light source structure and its applications to a backlight module and a display device.

Description of Related Art

A direct-light-type backlight module includes a back plate, plural light-emitting diodes and an optical film. The light-emitting diodes are arrayed on the back plate. The optical film is disposed above the light-emitting diodes to mix light generated by the light-emitting diodes.

Referring to FIG. 1 to FIG. 3, FIG. 1 is a schematic structural diagram showing a conventional light-emitting diode 100, FIG. 2 is a diagram of ray tracing simulation of the conventional light-emitting diode 100, and FIG. 3 is a diagram of light-mixing effect simulation of the conventional light-emitting diode 100. In the conventional light-emitting diode 100, a light-emitting chip 110 is packaged in the middle of a package body 120 to form a light-emitting body 110a, and the light-emitting body 110a is disposed on a circuit board 130. Therefore, light generated by the light-emitting chip 110 is mainly emitted from the top of the package body 120, so that the light emitted from the top of the package body 120 has high intensity and the light emitted from both sides of the package body is weak, thus resulting in dark areas formed between two adjacent light-emitting bodies 110a. The dark area formed between any two adjacent light-emitting bodies 110a located along an oblique direction is the most obvious (i.e. the dark area R1 as shown in FIG. 3), thus resulting in obvious contrasting appearance caused by the bright and dark areas of the backlight module and uneven light mixing phenomenon.

SUMMARY

One object of the present disclosure is to provide a light source structure, a backlight module and a display device, in which the light source structure can generate uniformly mixed light to enhance the optical appearance.

According to the aforementioned object, a light source structure is provided. The light source structure includes a substrate, plural light-emitting units, and plural packaging structures. The light-emitting units are arrayed on the substrate, in which each of the light-emitting units has a central optical axis which is vertical to the substrate. The packaging structures respectively cover and correspond to the light-emitting units, in which each of the packaging structures has a central axis which is vertical to the substrate. The central optical axes of the light-emitting units are shifted in the same direction from the central axes of the packaging structures.

According to an embodiment of the present invention, the light-emitting units are arrayed in a first direction and a second direction. An included angle is formed between a connecting line and the first direction or the second direction, wherein the connecting line is located between the central optical axis of each of the light-emitting units and the central axis of the packaging structure corresponding to the each of light-emitting units.

According to an embodiment of the present invention, the included angle is 45 degrees.

According to an embodiment of the present invention, a first distance is formed between the central optical axes of any two adjacent light-emitting units. A second distance is formed between the central axes of any two adjacent packaging structures. The first distance is equal to the second distance.

According to an embodiment of the present invention, an offset distance is formed between the central optical axis of each of the light-emitting units and the central axis of the packaging structure corresponding to the each of the light-emitting units, and the offset distances are equal.

According to the aforementioned object, a backlight module is provided. The backlight module includes the aforementioned light source structure and at least one optical film. The optical film is disposed above the light source structure. The optical film includes a main body and plural optical structures. The optical structures are disposed on the main body. Each of the optical structures is a tapered structure.

According to an embodiment of the present invention, each of the optical structures faces towards the light source structure.

According to an embodiment of the present invention, the main body has a first optical surface and a second optical surface opposite to each other. Each of the optical structures has a vertex and a central line, in which the central line is vertical to the first optical surface or the second optical surface of the main body, and the vertex is located on the central line.

According to an embodiment of the present invention, each of the optical structures has a plurality of side surfaces, and each of the side surfaces is a single surface. Each of the side surfaces has a normal line, and extending directions of the normal lines are different. Included angles between each of the normal lines and each of the central lines are equal.

According to an embodiment of the present invention, each of the optical structures has a plurality of side surfaces, and each of the side surfaces is a composite surface which is constituted by two or more than two surface units jointed in an extending direction of the central line.

According to an embodiment of the present invention, each of the optical structures has plural side surfaces surrounding the central line, and each of the side surfaces is a composite surface which is constituted by two or more layers of surface units jointed in an extending direction of the central line. Each of the surface units has a normal line. Plural included angles are formed between the central line and the normal lines of the surface units. The included angles between the central line and the normal lines of the surface units which are located in the same layer and surround the central line are substantially the same. The included angles between the central line and the normal lines of the surface units which are located in different layers and surround the central line are different.

According to an embodiment of the present invention, the included angles between the central line and the normal lines of the surface units which are located near to the vertex are smaller than the included angles between the central line and the normal lines of the surface units which are located away from the vertex.

According to an embodiment of the present invention, the included angles become smaller with increased distances between the respective surface units and the first optical surface.

According to an embodiment of the present invention, the main body has a first optical surface and a second optical surface opposite to each other. Each of the optical structures is a convex structure protruding from the first optical surface and/or the second optical surface.

According to an embodiment of the present invention, the main body has a first optical surface and a second optical surface opposite to each other. Each of the optical structures is a concave structure which is recessed into the first optical surface and/or the second optical surface.

According to the aforementioned object, a display device is provided. The display device includes the aforementioned backlight module and a display panel. The display panel is disposed in front of the backlight module.

According to the aforementioned embodiments of the present disclosure, by shifting the light-emitting units relative to the packaging structures, the amount of the light emitted from the side surfaces of the packaging structures can be increased, thereby increasing the brightness of the dark areas between any two adjacent packaging structures and reducing the contrast between the bright and dark areas of the light source structure, so as to achieve a good light mixing effect. On the other hand, the optical film of the present disclosure which has special optical structures can be cooperated with the light source structure of the present disclosure, so that light can be diverted to travel along different directions when passing through the optical structures, thereby achieving the objects of uniformizing light and improving the light luminance.

BRIEF DESCRIPTION OF THE DRAWINGS

The invention can be more fully understood by reading the following detailed description of the embodiment, with reference made to the accompanying drawings as follows.

DETAILED DESCRIPTION

Figure 4:
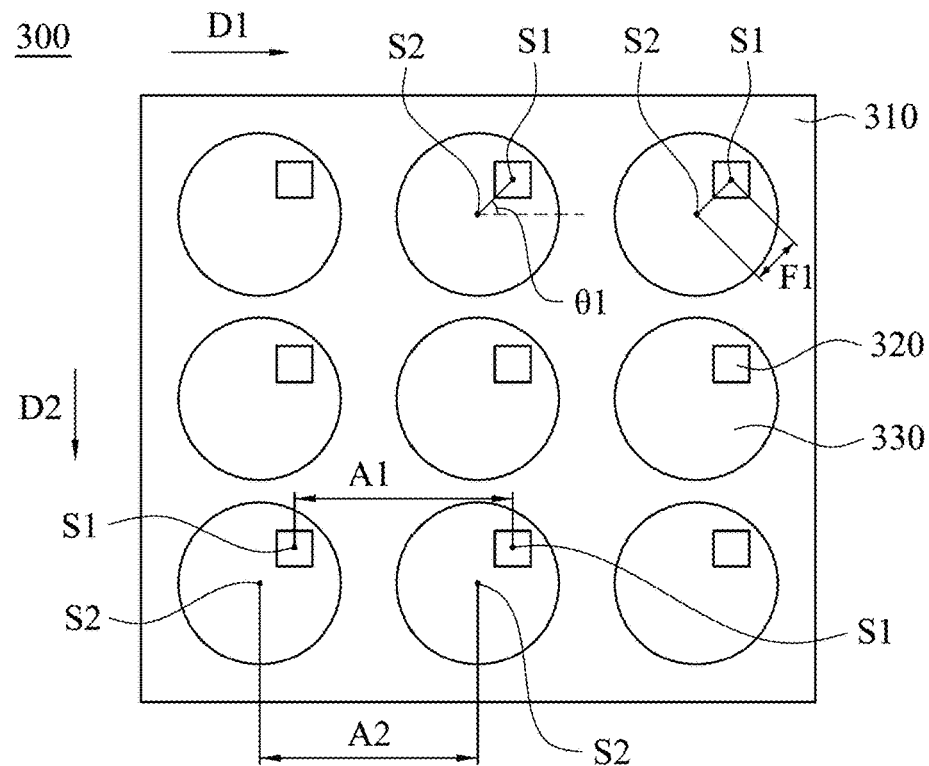
FIG. 4 is a schematic diagram showing a light source structure in accordance with an embodiment of the present disclosure.
Figure 5:
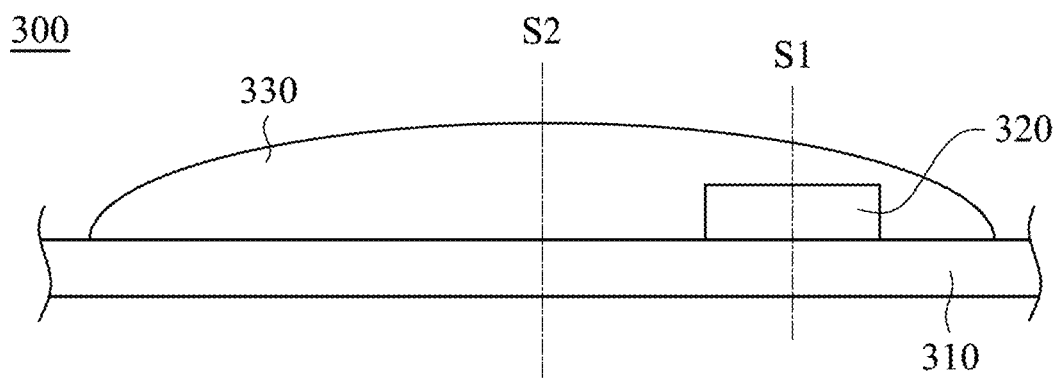
FIG. 5 is a partial side view showing the light source structure in accordance with an embodiment of the present disclosure.

Simultaneously referring to FIG. 4 and FIG. 5, FIG. 4 is a schematic diagram showing a light source structure 300 in accordance with an embodiment of the present disclosure, and FIG. 5 is a partial side view showing the light source structure 300 in accordance with an embodiment of the present disclosure. The light source structure 300 mainly includes a substrate 310, plural light-emitting units 320 and plural packaging structures 330. The light-emitting units 320 are arrayed on the substrate 310, and each of the light-emitting units 320 has a central optical axis S1 vertical to the substrate 310. In the present embodiment, the central optical axis S1 is a normal line which passes through a center of a light-emitting surface of the light-emitting unit 320. As shown in FIG. 4, in some embodiments, the light-emitting units 320 are arrayed in a first direction D1 and a second direction D2. In the present embodiment, the light-emitting units 320 are arranged in rectangular arrays, and embodiments of the present disclosure are not limited thereto. In other embodiments, the light-emitting units 320 may also be arranged in annular arrays, in circular arrays, or in other arrangement manners.

Referring to FIG. 4 and FIG. 5, the packaging structures 330 respectively cover and correspond to the light-emitting units 320. Each of the packaging structures 330 has a central axis S2 which is vertical to the substrate 310. In the present embodiment, the packaging structures 330 are arc-shaped structures. The central axis S2 of the present embodiment passes through the highest point of the arc-shaped structure. As shown in FIG. 4, each of the light-emitting units 320 is shifted relative to its corresponding packaging structure 330. In other words, the light-emitting units 320 are respectively and correspondingly located in the packaging structures 330, and each of the light-emitting units 320 is located near an edge of its corresponding packaging structure 330. Therefore, the central optical axis S1 of each of the light-emitting units 320 is offset from the central axis S2 of its corresponding packaging structure 330 by a distance F1. In the present embodiment, the central optical axes S1 of the light-emitting units 320 are shifted in the same direction from the central axes S2 of the packaging structures 330 by the same distance F1.

As shown in FIG. 4 and FIG. 5, in one embodiment, an included angle θ1 is formed between the first direction D1 and a connecting line, in which the connecting line is located between the central optical axis S1 of each of the light-emitting units 320 and the central axis S2 of the packaging structure 330 corresponding to each of light-emitting units 320. The included angle θ1 is 45 degrees. As shown in FIG. 4, in one embodiment, a first distance A1 is formed between the central optical axes S1 of any two adjacent light-emitting units 320, and a second distance A2 is formed between the central axes S2 of any two adjacent packaging structures 330 which respectively cover the two adjacent light-emitting units 320. The first distance A1 is equal to the second distance A2. In other words, the light-emitting units 320 and the packaging structures 330 are arranged at an equal interval, so that there is no need to change the conventional LED manufacturing process and its dispensing process.

Figure 6:
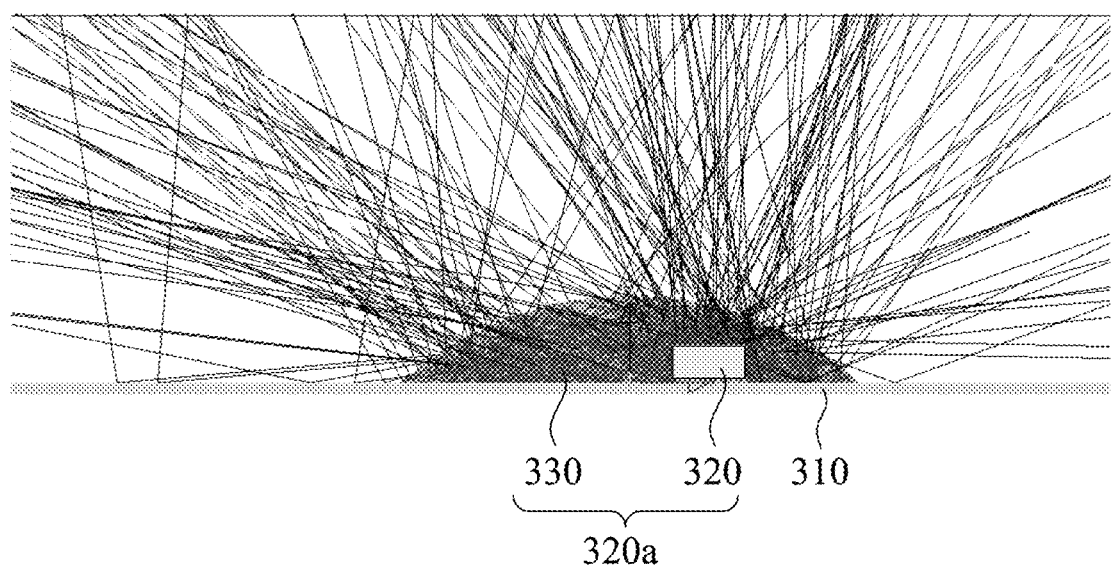
FIG. 6 is a diagram of ray tracing simulation of the light source structure in accordance with an embodiment of the present disclosure.

It is noted that, the light-emitting units 320 are shifted relative to the packaging structures 330, so that the brightest position (i.e. a portion which is located at the central optical axis S1) of each of the light-emitting units 320 and the highest position where the central axis S2 passes through of each of the packaging structures 330 are staggered. In other words, light emitted from the portion which is located at the central optical axis S1 of each of the light-emitting units 320 does not pass through the central axis S2 of each of the packaging structures. Therefore, referring to FIG. 6, FIG. 6 is a diagram of ray tracing simulation of the light source structure in accordance with an embodiment of the present disclosure. When the light-emitting units 320 are shifted from their corresponding packaging structures 330, the amount of light emitted from the side surfaces of the packaging structures 330 is increased, so that the brightness of dark areas located between any two adjacent packaging structures 330 is also increased.

Figure 7A:
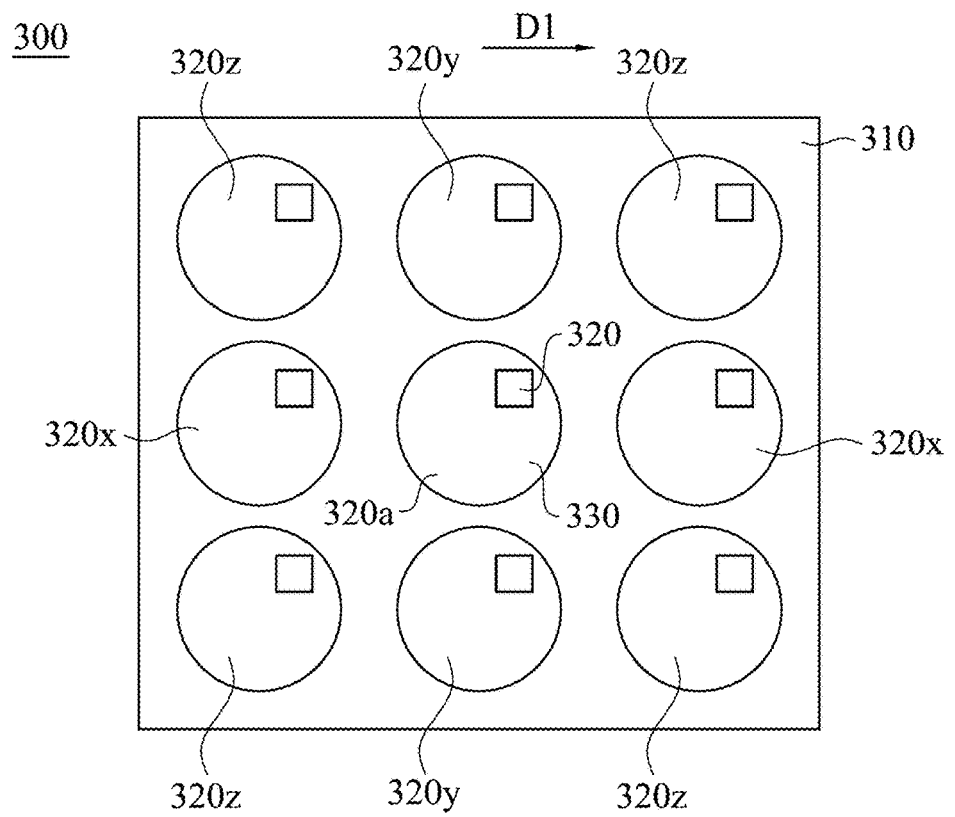
FIG. 7A is a schematic diagram showing a light source structure in accordance with an embodiment of the present disclosure.

Referring to FIG. 7A, FIG. 7A is a schematic diagram showing a light source structure in accordance with an embodiment of the present disclosure. It is noted that, the light source structure 300 in FIG. 7 has substantially the same structure as the light source structure 300 in FIG. 4. In order to clearly explain the optical principle of the present disclosure, different reference numerals are used in FIG. 7A to represent substantially the same element, such as a light-emitting body 320a, a light-emitting body 320x, a light-emitting body 320y and a light-emitting body 320z. As shown in FIG. 7A, the light source structure 300 includes plural light-emitting bodies, such as the light-emitting body 320a, the light-emitting body 320x, the light-emitting body 320y and the light-emitting body 320z, arranged on the substrate 310. The light-emitting unit 320a is mainly constituted by the light-emitting unit 320 and the packaging structure 330, and structures of the light-emitting unit 320x, the light-emitting unit 320y and the light-emitting unit 320z are substantially the same as the light-emitting unit 320a. As shown in FIG. 7A, the light-emitting bodies are arranged along the first direction D1 and the second direction D2. With the light-emitting body 320a as a reference, the light-emitting bodies 320x are located at two opposite sides (i.e. a left side and right side of the light-emitting body 320a as shown in FIG. 7A) of the light-emitting body 320a along the first direction D1, and light-emitting bodies 320y are located at two opposite sides (i.e. an upper side and a lower side as shown in FIG. 7A) along the second direction D2, and the light-emitting bodies 320z are respectively located at a upper right side, a lower right side, a upper left side and a lower left side of the light-emitting body 320a. Under the condition that the light-emitting bodies are arranged along the first direction D1 and the second direction D2 equidistantly, because a distance between the light-emitting body 320a and the light-emitting body 320z which is located oblique to the light-emitting body 320a is greater than a distance between the light-emitting body 320a and the light-emitting body 320x (or the light-emitting body 320y), a relatively dark area is likely formed between the light-emitting body 320a and the light-emitting body 320z. In order to compensate the light emitted from the central optical axes S1 of the light-emitting units 210 for the dark areas, the light-emitting units 320 of the present disclosure are shifted by a distance relative to the packaging structures 330 in the same oblique direction. Therefore, the contrast between bright and dark areas of the light source structure 300 can be reduced, thereby obtaining a better light-mixing effect.

If the light-emitting units are merely moved relative to the packaging structures in a horizontal direction or a vertical direction, the shape and the dimension of the dark areas between any two adjacent light-emitting bodies along the oblique direction are not changed much. If the light-emitting units which surround a central light-emitting body are moved relative to the central light-emitting body in a radial direction, bright areas of the light-emitting bodies which surround the central light-emitting body are far away from a bright area of the central light-emitting body, thus resulting in an increase of dimension of a dark area which surrounds the central light-emitting body, which effects the appearance and taste of the display device. Therefore, by shifting the light-emitting units in their corresponding light-emitting bodies along the same oblique direction, the dark areas between any two adjacent light-emitting bodies which are arranged along the oblique direction can be reduced, and light energy saved by reducing the dark areas can be transferred to other areas to increase the overall brightness.

Figure 3:
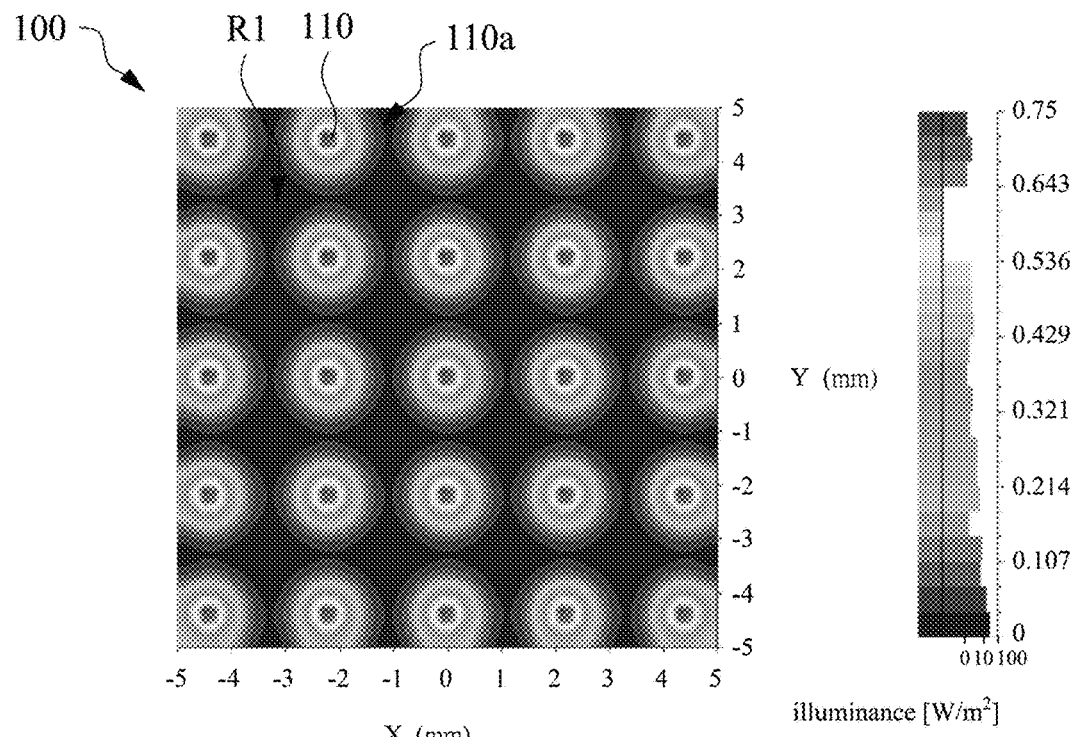
FIG. 3 is a diagram of light-mixing effect simulation of the conventional light-emitting diode.
Figure 7B:
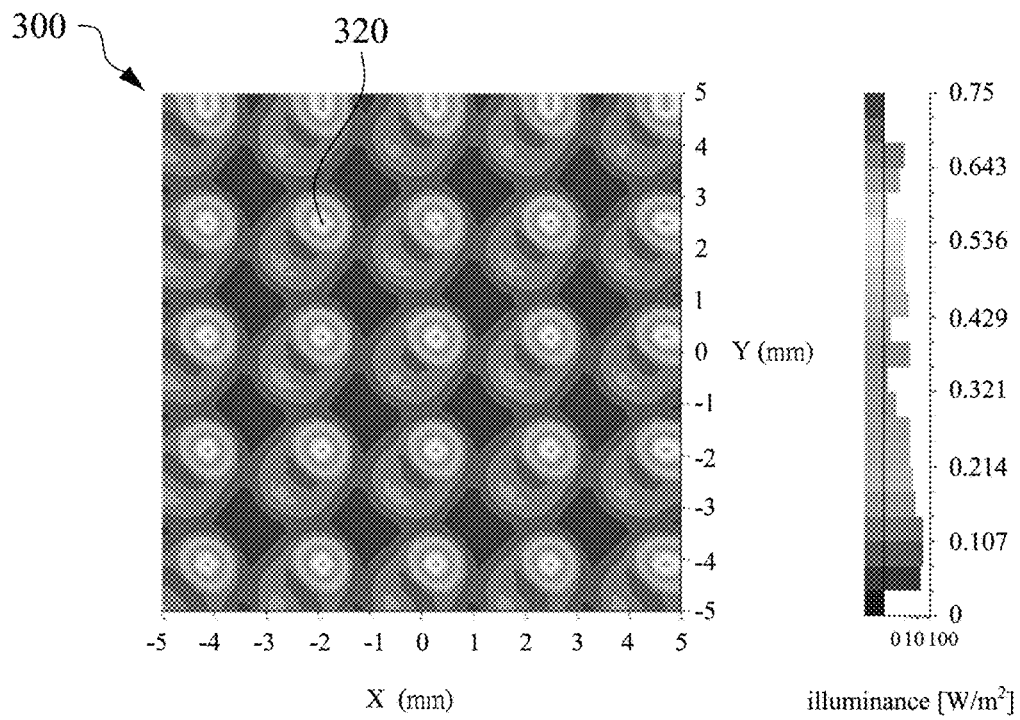
FIG. 7B is a diagram of light-mixing effect simulation of the light source structure in accordance with an embodiment of the present disclosure.

Referring to FIG. 3, FIG. 7A and FIG. 7B, FIG. 7B is a diagram of light-mixing effect simulation of the light source structure in accordance with an embodiment of the present disclosure. Compared with the light mixing effect generated by the conventional light emitting diodes, the light source structure 300 of the present embodiment has a lower contrast between the bright and dark areas has a better the light mixing effect. More specifically, as shown in FIG. 3, in the diagram of light-mixing effect simulation generated by the conventional light emitting diode, it can be seen that a dark dot in the center of each light-emitting body 110a represents a light-emitting area with the highest brightness of the light-emitting chip 110, and a light gray area which surrounds the center dark dot represents a light-emitting area with a sub-brightness of the light-emitting chip 110, and a dark gray area located between any two adjacent light-emitting bodies 110a represents the dark area R1 as described in the present disclosure. As shown in FIG. 3, there is a large dark area which surrounds the light-emitting body 110a. Compared to FIG. 3, the simulation diagram of the light mixing effect generated by the light source structure 300 in FIG. 7B shows that, the areas in which the light-emitting units 320 are located have the highest brightness, although the brightness of those areas is slightly lower than the brightness of the area in which the light-emitting chips 110 are located, the overall brightness of the backlight module would not be affected. A size of a light-emitting area with a sub-brightness which surrounds each of the light-emitting units 320 is not changed too much. On the other hand, the dark gray areas shown in FIG. 7B have a lower color level than the dark gray area between any two adjacent light-emitting bodies 110a in FIG. 3, meaning that the overall light mixing effect of the light source structure 300 shown in FIG. 7B is better. The reason is that the light source structure 300 of the present disclosure can direct the light emitted from the light-emitting units 320 along the central optical axis S1 or along the normal line of the substrate 310 to deviate from the central optical axis S1, and can guide a portion of the light in the bright areas to the dark areas, thereby resolving a problem of the contrast between the bright areas and the dark areas, thus improving the overall optical taste of the backlight module. Therefore, by shifting the light-emitting units 320 relative to their corresponding packaging structures 330 can generate a better light mixing effect of the light source structure 300.

Figure 1:
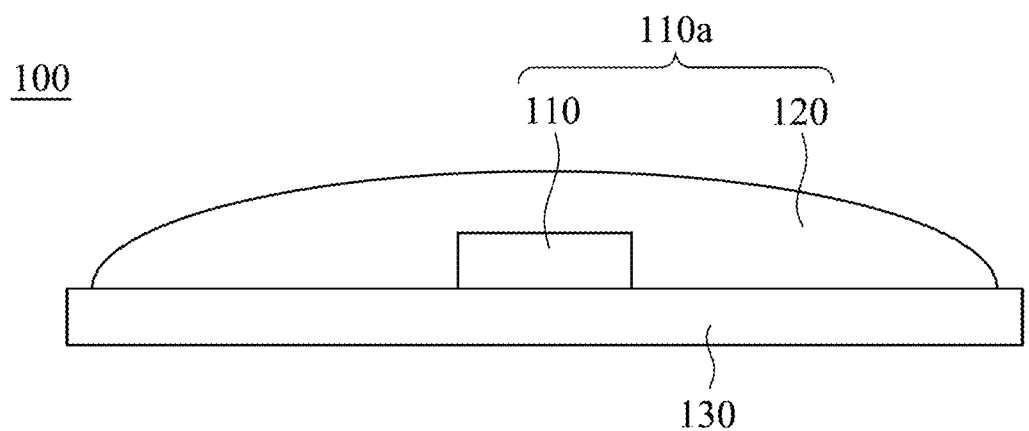
FIG. 1 is a schematic structural diagram showing a conventional light-emitting diode.
Figure 2:
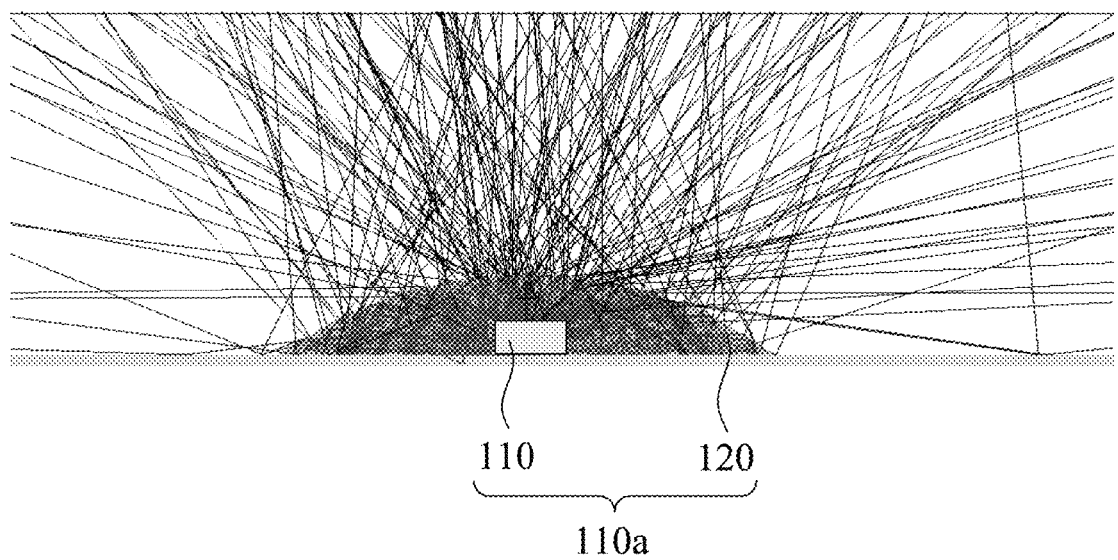
FIG. 2 is a diagram of ray tracing simulation of the conventional light-emitting diode.
Figure 8:
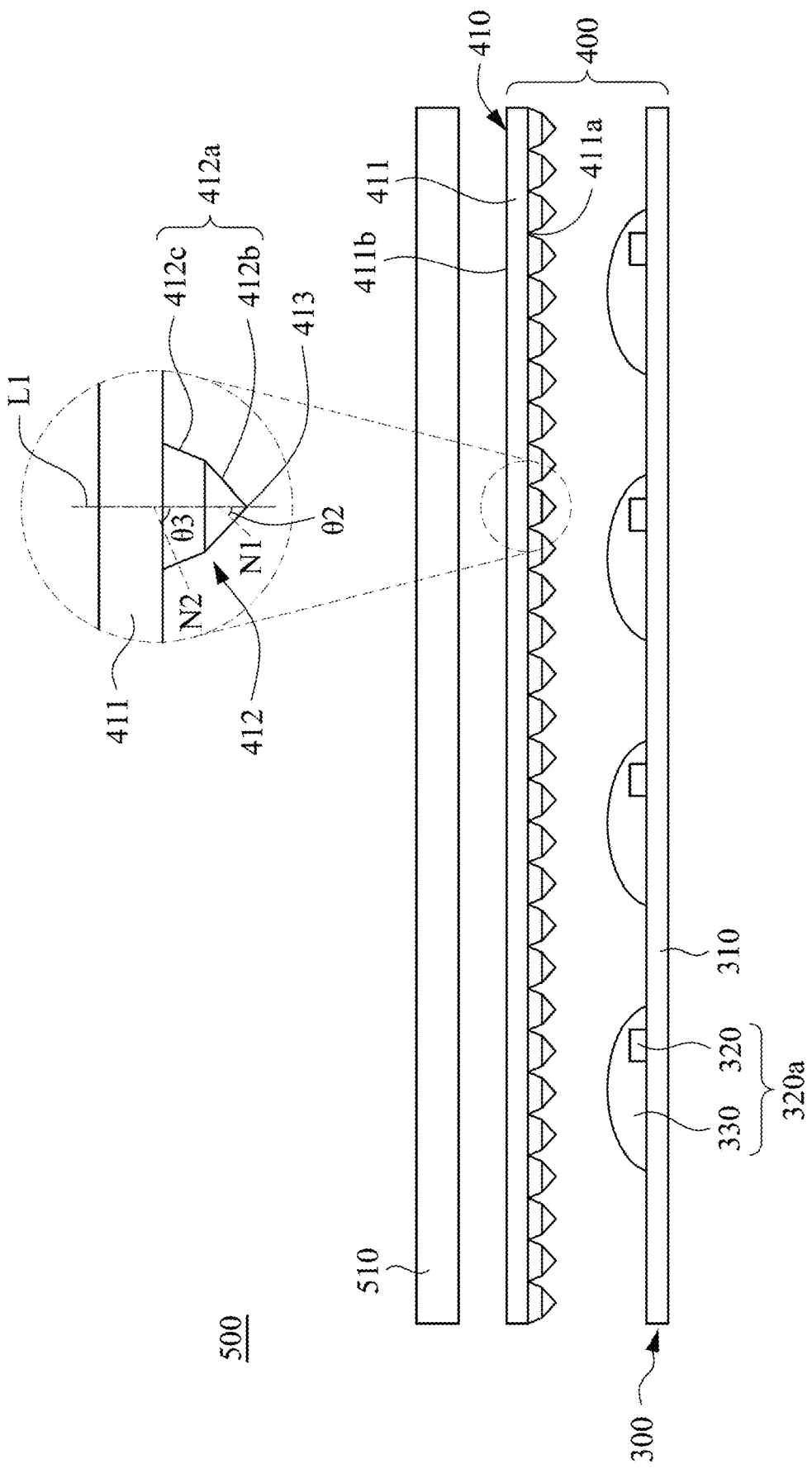
FIG. 8 is a schematic diagram showing a display device in accordance with an embodiment of the present disclosure.

Referring to FIG. 8, FIG. 8 is a schematic diagram showing a display device 500 in accordance with an embodiment of the present disclosure. The display device 500 of the present embodiment mainly includes a backlight module 400 and a display panel 510. The display panel 510 is disposed in front of the backlight module 400. The backlight module 400 includes the aforementioned light source structure 300 and at least one optical film 410 disposed above the light source structure 300. Referring to FIG. 4, the light light-emitting units 320 are arrayed on the substrate 310, and the optical film 410 is able to be applied in direct-lit module to receive light emitted from the light source structure 300. The optical film 410 is used to mix light generated from the light-emitting units 320 of the light source structure 300 so as to increase the overall luminance of the backlight module 400. In the present embodiment, the optical film 410 includes a main body 411 and plural optical structures 412 disposed on the main body 411. More specifically, the main body 411 has a first optical surface 411a and a second optical surface 411b opposite to the first optical surface 411a. In the present embodiment, the first optical surface 411a faces towards the light source structure 300. The optical structures 412 are disposed on the first optical surface 411a and face toward the light source structure 300. The optical structures 412 are used to reflect and refract light. The light source structure 300 of the present disclosure can direct a portion of the light which is emitted from the center of the light-emitting units 320 diagonally outward, which helps to reduce the contrast between the bright and dark areas of the light source structure 300. Compare the ray tracing situations of the light-emitting body 110a in FIG. 2 with the light-emitting body 320a of the present disclosure in FIG. 6, light density emitted from the center of the light-emitting body 320a shown in FIG. 6 is lower than light density emitted from the center of the light-emitting body 110a shown in FIG. 2, and light density emitted obliquely from the light-emitting body 320a shown in FIG. 6 is greater than light density emitted obliquely from the light-emitting body 110a shown in FIG. 2. Therefore, a portion of the light emitted obliquely from the light-emitting body 320a can be reflected back to the substrate 310 by the optical structures 412, and the substrate 310 can further reflect the light back to the optical structures 412, so that the light which is not emitted out of the optical film 410 can be efficiently recycled and reused, thereby reducing the loss of the light and evenly mixing the exiting light the optical film 410.

Figure 9:
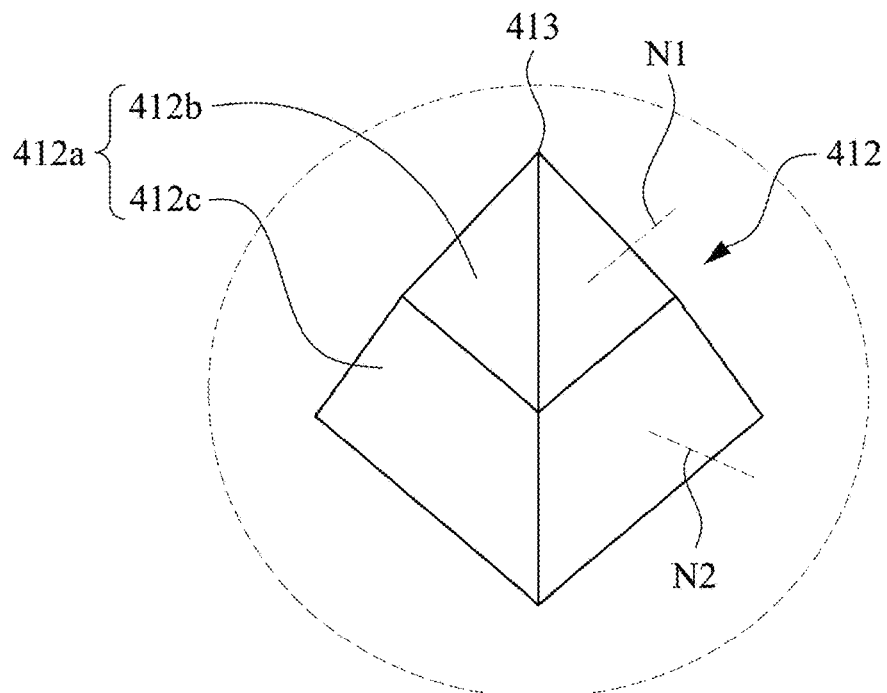
FIG. 9 is a schematic structural diagram showing an optical structure in accordance with an embodiment of the present disclosure.

Simultaneously referring to FIG. 8 and FIG. 9, FIG. 9 is a schematic structural diagram showing an optical structure in accordance with an embodiment of the present disclosure. In one embodiment, each of the optical structures 412 is a tapered structure and has plural side surfaces 412a jointed together to form a vertex 413. Each of the optical structures 412 has a central line L1 which is vertical to the main body 411 of the optical film 410. The vertex 413 is located on the central line L1, and the central line L1 is vertical to the first optical surface 411a or the second optical surface 411b of the main body 411. More specifically, as shown in FIG. 9, each of the side surfaces 412a is a composite surface which is has two or more surface units jointed together. In the present embodiment, each of the optical structures 412 is a quad-rangular pyramid structure which has four side surfaces 412a. Each of the side surfaces 412a is a composite surface which has a first layer surface unit 412b and a second layer surface unit 412c jointed along the central line L1. In the present embodiment, each of the first layer surface units 412b has a normal line N1, and each of the second layer surface units 412c has a normal line N2. It is noted that, the "normal lines" as referred herein, refer to lines respectively perpendicular to the first layer surface units 412b and the second layer surface units 412c. Extending directions of the normal lines N1 and the normal lines N2 are different. As shown in FIG. 8, an included angle θ2 is formed between the central line L1 and the normal line N1 of each of the first layer surface units 412b, and an included angle θ3 is formed between the central line L1 and the normal line N2 of each of the second layer surface unit 412c. The included angles θ2 which are respectively formed between the normal line N1 and the central line L1 of each of the first layer surface unit 412b are equal, and the included angles θ3 which are respectively formed between the normal line N2 and the central line L1 of each of the second layer surface unit 412c are equal, in which the included angles θ2 are not equal to the included angles θ3. In other words, the first layer surface unit 412b and the second layer surface unit 412c are different inclined surfaces having different inclinations. In some embodiments, the included angles θ2 of the first layer surface units 412b which are near the vertex 413 can be designed to be greater or smaller than the included angles θ3 of the second layer surface units 412c which are away from the vertex 413, so as to from different inclined surfaces having different inclinations. Therefore, by using different inclined surfaces having different degrees of inclinations to refract and reflect light, the light generated by each of the light-emitting units 320 can be scattered as wide as possible to avoid light concentration at a specific angle or the emitting light concentrated upward, so that light can be emitted along different paths so as to achieve the objects of uniformizing light and increasing light luminance. In addition, in the optical structure 412 of the present embodiment, the included angles θ2 of the first layer surface units 412b which are near the vertex 413 are smaller than the included angles θ3 of the second layer surface unit 412c which are away from the vertex 413. In other words, the included angles between the normal line and the central line of each of the surface units become smaller with increased distances between the respective surface units and the first optical surface. Therefore, the manufacturing process of the optical film 410 of the present disclosure is easy and has high yield.

It is noted that, in the embodiment of FIG. 8, the optical structures 412 are disposed on the first optical surface 411a of the main body 411, which is not used to limit the present disclosure. In other embodiments, the optical structures can be disposed on the second optical surface of the main body, or the optical structures can be disposed on the first optical surface and the second optical surface of the main body at the same time, thereby achieving the same light mixing effect.

Figure 10:
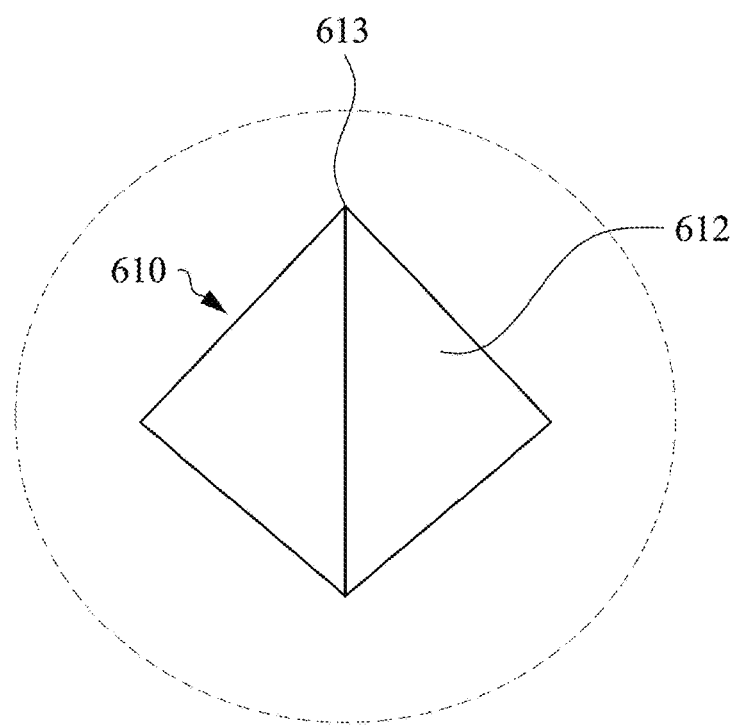
FIG. 10 is a schematic structural diagram showing another optical structure in accordance with an embodiment of the present disclosure.
Figure 11:
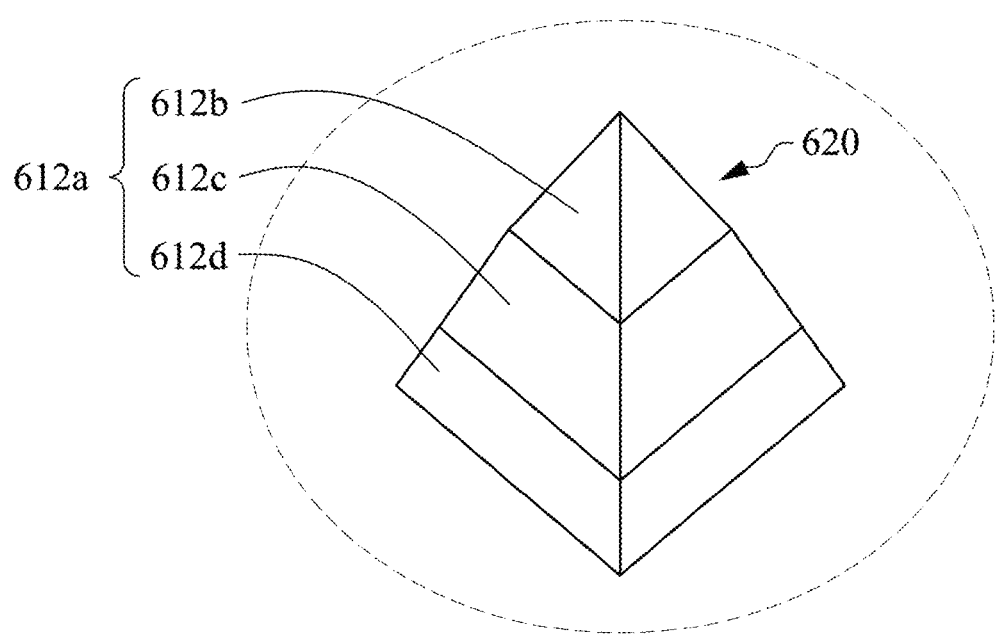
FIG. 11 is a schematic structural diagram showing another optical structure in accordance with an embodiment of the present disclosure.

In other embodiments, the optical structures may have different designs. Referring to FIG. 10, FIG. 10 is a schematic structural diagram showing another optical structure 610 in accordance with an embodiment of the present disclosure. In the embodiment of FIG. 10, the optical structure 610 has four side surfaces 612, and each of the side surfaces 612 is a single surface, especially a plain surface. Referring to FIG. 11, FIG. 11 is a schematic structural diagram showing another optical structure 620 in accordance with an embodiment of the present disclosure. In the embodiment of FIG. 10, the optical structure 620 has four side surfaces 612a, and each of the side surfaces 612a has three surface units 612b, 612c, and 612d jointed together. In the present disclosure, each of the optical structures is not limited to a quadrangular pyramid structure. In other embodiments, each of the optical structures can be a triangular pyramid structure, a pentagonal pyramid structure, a cone structure, or other structures that can refract and reflect light to achieve the object of mixing light.

Figure 12:
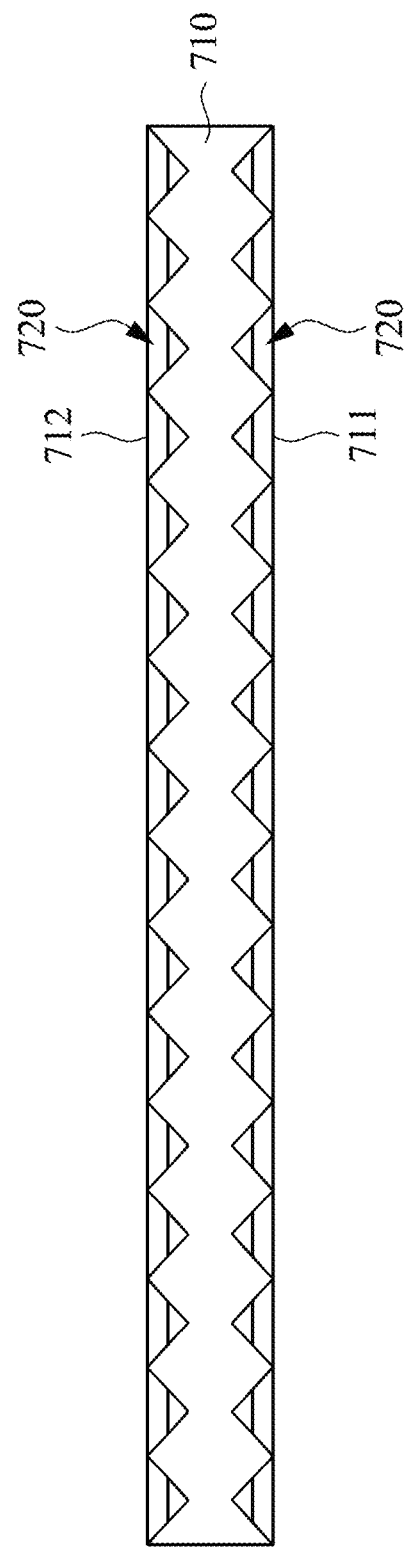
FIG. 12 is a schematic structural diagram showing an optical film in accordance with another embodiment of the present disclosure.

It is noted that, the optical structures described above are not limited to be convex structures. In other embodiments, the optical structures can be designed to be concave structures. Referring to FIG. 12, FIG. 12 is a schematic structural diagram showing an optical film 700 in accordance with another embodiment of the present disclosure. The optical film 700 of the present embodiment includes a main body 710 and plural optical structures 720. The main body 710 has a first optical surface 711 and a second optical surface 712 opposite to the first optical surface 711, and the optical structures 720 are disposed on both the first optical surface 711 and the second optical surface 712. In the present embodiment, the optical structures 720 are concave structures. Each of the optical structures 720 is a tapered structure and has plural side surfaces and a vertex. Therefore, when the light passes through the optical film 700, the light can be refracted by the side surfaces of these tapered structures to travel along different path directions, thereby achieving the objects of uniformizing light and enhancing light-emitting luminance. It is noted that, the structural design of optical structures 720 is similar to the aforementioned optical structures 412, 610 or 620, and the optical structures 720 also can be applied to the aforementioned backlight module and display device, and the application principles of the optical structures 720 are the similar to those of the aforementioned embodiments, and therefore will not be described again herein.

It should be noted that, each of the optical structures of the present disclosure has plural side surfaces to refract multi-directional light emitted from the light source structure, thereby changing the direction of light path, so as to avoid the problem of high intensity of light emitted from directly above each packaging structure and weak intensity of light emitted from two sides of each packaging structure. In other words, each of the optical structures of the present disclosure does not have a surface which is parallel to the light emitting surface of the light source structure. For example, as shown in FIG. 9 and FIG. 12, the side surfaces of each of the optical structures which are connected to form a vertex and are not parallel to the light emitting surface of the light source structure. Therefore, after the light is emitted from the light source structure, traveling directions of most of the light can be changed by the side surfaces of the optical structures. Therefore, the present disclosure not only can reduce the contrast between the bright areas and the dark areas to achieve good light-mixing effect and better optical taste, but also can increase light uniformity and enhance light luminance.

Moreover, as shown in FIG. 10, the optical structure 610 in FIG. 10 has four side surfaces 612, and each of the side surfaces 612 is a single surface. Therefore, most of the light generated by the light source structure can be diverted by the side surfaces 612 of the optical structure 610 to travel along four directions, and will no longer be concentrated directly above the packaging structures, so that the light uniformity can be improved. With the increase in the numbers of the side surfaces of each optical structure, the light can be diverted to travel along more directions. However, due to the increase in the number of traveling directions, the overall light energy remains unchanged, which may result in the reduction of the light energy in each direction. Therefore, each of the side surfaces can be designed by jointing two or more than two layers of surface units together so as to change the refraction and reflection directions of a portion of the light.

Figure 13:
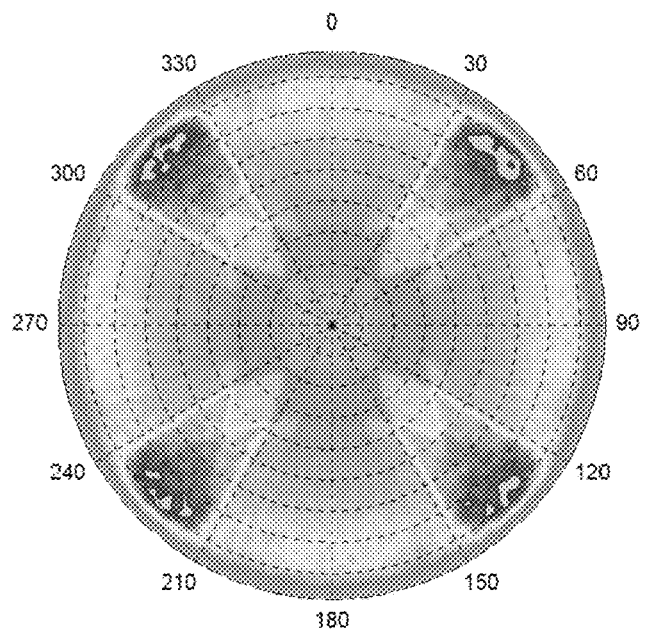
FIG. 13 is a diagram of light-mixing effect simulation of the optical structure shown in FIG. 10.
Figure 14:
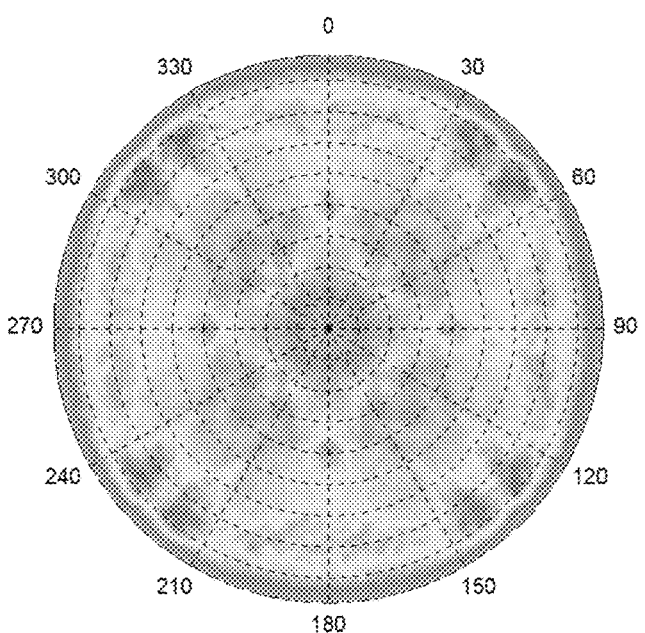
FIG. 14 is a diagram of light-mixing effect simulation of the optical structure shown in FIG. 9.

For example, simultaneously referring to FIG. 10 and FIG. 13, FIG. 13 is a diagram of light-mixing effect simulation of the optical structure shown in FIG. 10. In the embodiment of FIG. 10, the four side surfaces 612 of the optical structure 610 are designed to deflect light toward four primary directions. For example, as shown in FIG. 13, a main portion of light is guided to four primary directions, such as 30° to 60°, 120° to 150°, 210° to 240°, and 300° to 330°. Simultaneously referring to FIG. 9 and FIG. 14, FIG. 14 is a diagram of light-mixing effect simulation of the optical structure shown in FIG. 9. In the embodiment of FIG. 9, the four side surfaces 412a of the optical structure 412 can also deflect light toward the four primary directions, and because each of the side surfaces 412a in FIG. 9 has the first layer surface unit 412b and the second layer surface unit 412c, the light emits towards the first layer surface unit 412b and second layer surface unit 412c can be refracted and reflected towards different directions. By the design of the first layer surface unit 412b and the second layer surface unit 412c, a portion of the light which travels along four primary directions can be diverted to travel along other four sub directions which are slightly offset from the four primary directions. As shown in FIG. 14, intensities of light guided to four primary directions, such as 30° to 60°, 120° to 150°, 210° to 240° and 300° to 330° are lower than intensities of the light shown in FIG. 13, which means that the light is not only guided to the four primary directions, but also to the other four sub directions. Therefore, the light intensities in the four primary directions are slightly reduced, and the overall light luminance becomes uniform. In other words, the design of the first layer surface unit 412b and the second layer surface unit 412c can increase the number of light traveling directions without significantly affecting the light energy of the four primary directions, thereby improving the light uniformity and maintaining the light energy of the primary directions. It is noted that, the aforementioned optical film is able to be applied in the direct-lit backlight module to receive light emitted from the light source structure, and divert the light to the primary directions, so as to reduce the accumulation of the light. Besides, the at least two layers of the surface units of each optical structure facilitates to divert a portion of the light from the primary directions to the sub directions. Therefore, the light-accumulation reducing effect is more enhanced and the objects of uniformizing light and improving the light luminance are achieved. In addition, the optical film of the present disclosure which is used to be applied in the direct-lit backlight module has different functions from a conventional optical film which is used to be applied in a side-lit backlight module. Because a light source of the side-lit backlight module is set at a side of a light guide plate, light emitted from the light source and entering the light guide plate will be obliquely emitted out from a light-emitting surface of the light guide plate, so as to form an included angle between a light-emitting direction and the normal line of the light-emitting surface of the light guide plate. For the oblique light-emitting direction, the function of the conventional optical film applied to the side-lit backlight module is to guide the oblique light-emitting direction into a normal direction, for example, a turning film with lenticular microstructures will be applied. Compared to the function of the conventional optical film, the function of the optical film of the present disclosure is to guide the lights to several primary directions or sub directions. Therefore, the functions between the conventional optical film and the optical film of the present disclosure are different.

Figure 15:
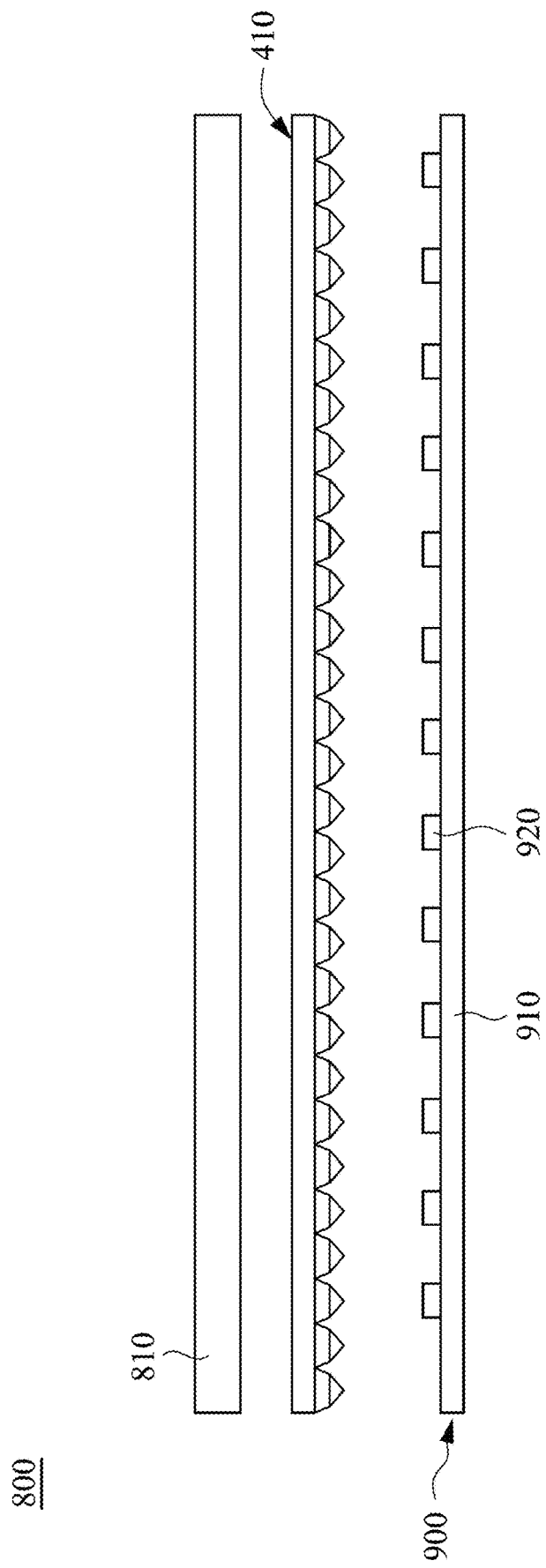
FIG. 15 is a schematic diagram showing a display device in accordance with an embodiment of the present disclosure.

It is noted that, in the embodiment of the display device 500 as shown in FIG. 8, the optical film 410 is collocated with the light source structure 300 which has the light-emitting units 320 disposed offset from the packaging structures 330. In other embodiments, the optical film 410 can be collocated with different light source structure. Referring to FIG. 15, FIG. 15 is a schematic diagram showing a display device 800 in accordance with an embodiment of the present disclosure. The display device 800 mainly includes a light source structure 900, the aforementioned optical film 410 and a display panel 810. The light source structure 900 includes a substrate 910 and plural light-emitting units 920 arrayed on the substrate 910. Therefore, after light emitted by the light-emitting units 920 passes through the optical film 410, the light can dispersedly emit out from the optical film 410, thereby increasing light informality. In the present embodiment, the optical film 410 can also be replaced with the optical film 700 as shown in FIG. 12 to achieve the same optical effect.

According to the aforementioned embodiments of the present disclosure, by shifting the light-emitting units relative to the packaging structures, the amount of the light emitted from the side surfaces of the packaging structures can be increased, thereby increasing the brightness of the dark areas between any two adjacent packaging structures and reducing the contrast between the bright and dark areas of the light source structure, so as to achieve a good light mixing effect. On the other hand, the optical film of the present disclosure which has special optical structures can be cooperated with the light source structure of the present disclosure, so that light can be diverted to travel along different directions when passing through the optical structures, thereby achieving the objects of uniformizing light and improving the light luminance.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A backlight module, comprising:
a light generator configured to emit light and including a substrate and a plurality of light-emitting units;
at least one light mixer being capable of generating light mixing effect from the light emitted from the light-emitting units of the light generator; and
at least one optical film disposed above the light mixer to generate a light distribution, wherein the optical film comprises:
a main body; and
a plurality of optical structures separately distributed on the main body along a first axis and a second axis, wherein each of the optical structures is a tapered structure with multiple facets, the first axis is non-parallel to the second axis, each of the optical structures has a plurality of side surfaces, a vertex and a central line, and the central line is vertical to an optical surface of the optical film, the vertex is located on the central line, and the side surfaces are joined together to form the vertex and side edges of two adjacent side surfaces are connected to each other; wherein each of the optical structures has a first side surface and a second side surface arranged in the first axis, and a third side surface and a fourth side surface arranged in the second axis; wherein each of the side surfaces is a composite surface which is constituted by two or more layers of surface units with different slopes to be categorized as a first layer surface unit and a second layer surface unit; wherein each of the surface units has a normal line; wherein a plurality of included angles are formed between the central line and the normal lines of the surface units, wherein the included angles between the central line and the normal lines of the surface units which are located in the first layer surface units are substantially the same, the included angles between the central line and the normal lines of the surface units which are located in the second layer surface units are substantially the same; and the included angles between the central line and the normal lines of the surface units which are located in the first layer surface units are different from the included angles between the central line and the normal lines of the surface units which are located in the second layer surface units;
wherein the light distribution has a center normal to the at least one optical film, and the light distribution is not concentrated directly above the center but split as a first portion and a second portion;
wherein the first portion of the light distribution is diverted by the side surfaces of the optical structures which are located in the first layer surface units so as to be intensely concentrated at a plurality of primary areas with intervals; and
wherein the second portion of the light distribution is diverted by the side surfaces of the optical structures which are located in the second layer surface units so as to be sparsely concentrated at a plurality of sub areas between the plurality of primary areas.

2. The backlight module of claim 1, wherein each of the optical structures has one faceted shape at a cross section of the first axis and another faceted shape at a cross section of the second axis.

3. The backlight module of claim 2, wherein each of the optical structures is a symmetrical pyramid structure, the first side surface and the second side surface are symmetrically arranged in the first axis, and the third side surface and the fourth side surface are symmetrically arranged in the second axis.

4. The backlight module of claim 1, wherein each of the side surfaces is the composite surface which is constituted by the two or more layers of surface units jointed in an extending direction of the central line, wherein extending directions of the normal lines are different.

5. The backlight module of claim 1, wherein the plurality of light-emitting units are arrayed in a first direction and a second direction on the substrate.

6. The backlight module of claim 1, wherein the included angles between the central line and the normal lines of the surface units which are located in the first layer surface units are smaller than the included angles between the central line and the normal lines of the surface units which are located in the second layer surface units.

7. The backlight module of claim 1, wherein the included angles become smaller with increased distances between the respective surface units and the optical surface.

8. The backlight module of claim 1, wherein
the main body has a first optical surface and a second optical surface opposite to each other; and
each of the optical structures is a convex structure protruding from the first optical surface and/or the second optical surface.

9. The backlight module of claim 1, wherein
the main body has a first optical surface and a second optical surface opposite to each other; and
each of the optical structures is a concave structure which is recessed into the first optical surface and/or the second optical surface.

10. The backlight module of claim 1, wherein each of the optical structures faces towards the light mixer.

11. A display device, comprising:
a backlight module of claim 1; and
a display panel disposed in front of the backlight module.

12. A backlight module, comprising:
a light generator configured to emit light and including a substrate and a plurality of light-emitting units;
at least one light mixer being capable of generating light mixing effect from the light emitted from the light-emitting units of the light generator; and
at least one optical film disposed above the light mixer, wherein the optical film comprises:
a main body; and
a plurality of optical structures separately distributed on the main body along a first axis and a second axis, wherein each of the optical structures is a tapered structure with multiple facets, the first axis is non-parallel to the second axis, each of the optical structures has a plurality of side surfaces, a vertex and a central line, and the central line is vertical to an optical surface of the optical film, the vertex is located on the central line, and the side surfaces are joined together to form the vertex and side edges of two adjacent side surfaces are connected to each other; wherein each of the optical structures has a first side surface and a second side surface arranged in the first axis, and a third side surface and a fourth side surface arranged in the second axis; wherein each of the side surfaces is a composite surface which is constituted by two or more layers of surface units with different slopes;
wherein the plurality of light-emitting units are arrayed in a first direction and a second direction on the substrate;
the light mixer comprises a plurality of light mixers respectively covering and corresponding to the light-emitting units, wherein each of the light mixers has a central axis which is vertical to the substrate;
wherein a plurality of central optical axes of the light-emitting units are shifted in the same direction from the central axes of the light mixers; and
wherein an included angle is formed between a connecting line and the first direction or the second direction, and the connecting line is located between the central optical axis of each of the light-emitting units and the central axis of each of the light mixers corresponding to the each of light-emitting units.

13. The backlight module of claim 12, wherein the included angle is 45 degrees.

14. The backlight module of claim 12, wherein
a first distance is formed between the central optical axes of any two adjacent light-emitting units; and
a second distance is formed between the central axes of any two adjacent light mixers;
wherein the first distance is equal to the second distance.

15. The backlight module of claim 12, wherein an offset distance is formed between the central optical axis of each of the light-emitting units and the central axis of each of the light mixers corresponding to the each of the light-emitting units, and the offset distances are equal.

16. A display device, comprising:
a backlight module of claim 13; and
a display panel disposed in front of the backlight module.

* * * * *